United States Patent
Yan et al.

(10) Patent No.: US 9,963,822 B2
(45) Date of Patent: May 8, 2018

(54) POLYURETHANE DISPERSION BASED SYNTHETIC LEATHERS

(71) Applicants: Yunfei Yan, Shanghai (CN); Ning Kang, Shandong (CN); Jiansheng Feng, Shanghai (CN); Qian Shen, Shanghai (CN); Chao Zhang, Shanghai (CN); Weichao Gu, Shanghai (CN); Hong Liang Zhang, Shanghai (CN); ROHM AND HAAS COMPANY, Philadelphia, PA (US)

(72) Inventors: Yunfei Yan, Shanghai (CN); Ning Kang, Shandong (CN); Jiansheng Feng, Shanghai (CN); Qian Shen, Shanghai (CN); Chao Zhang, Shanghai (CN); Weichao Gu, Shanghai (CN); Hong Liang Zhang, Shanghai (CN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 190 days.

(21) Appl. No.: 14/759,976

(22) PCT Filed: Jan. 11, 2013

(86) PCT No.: PCT/CN2013/070353
§ 371 (c)(1),
(2) Date: Jul. 9, 2015

(87) PCT Pub. No.: WO2014/107878
PCT Pub. Date: Jul. 17, 2014

(65) Prior Publication Data
US 2015/0354133 A1    Dec. 10, 2015

(51) Int. Cl.
*D06N 3/14* (2006.01)
*D06N 3/00* (2006.01)
(Continued)

(52) U.S. Cl.
CPC ........... *D06N 3/14* (2013.01); *B32B 5/245* (2013.01); *B32B 27/065* (2013.01);
(Continued)

(58) Field of Classification Search
CPC ..... B32B 5/245; B32B 27/065; B32B 27/308; D06N 3/0097; D06N 3/14; D06N 3/183;
(Continued)

(56) References Cited

U.S. PATENT DOCUMENTS 2,968,575 A    1/1961    Mallonee
3,412,054 A    11/1968   Milligan et al.
(Continued)

FOREIGN PATENT DOCUMENTS

| CN | 102407637 A | 4/2012 |
|---|---|---|
| WO | 2004/061198 | 7/2004 |
| WO | 2008/103220 | 8/2008 |

*Primary Examiner* — Catherine A Simone

(57) ABSTRACT

A multilayer structure including (a) a fabric, (b) a polyurethane foam containing a plurality of cells defined therein, wherein the foam contains at least one surfactant, and (c) a skin layer, wherein the skin layer comprises a wetting agent and an acrylic polymer having a glass transition temperature of −20 degree Celsius or less, and the foam resides between the fabric and the skin layer; and the process of preparing the multilayer structure.

5 Claims, 1 Drawing Sheet

(51) Int. Cl.
*D06N 3/04* (2006.01)
*D06N 3/18* (2006.01)
*C09D 175/06* (2006.01)
*B32B 5/24* (2006.01)
*B32B 27/06* (2006.01)
*B32B 27/30* (2006.01)

(52) U.S. Cl.
CPC .......... *B32B 27/308* (2013.01); *C09D 175/06* (2013.01); *D06N 3/0059* (2013.01); *D06N 3/0097* (2013.01); *D06N 3/042* (2013.01); *D06N 3/047* (2013.01); *D06N 3/183* (2013.01); *B32B 2266/0278* (2013.01); *D06N 2211/28* (2013.01); *Y10T 428/24512* (2015.01); *Y10T 428/249991* (2015.04)

(58) Field of Classification Search
CPC .... D06N 2211/28; D06N 3/042; D06N 3/047; C09D 175/06
See application file for complete search history.

(56) References Cited

U.S. PATENT DOCUMENTS

| | | |
|---|---|---|
| 3,905,929 A | 9/1975 | Noll |
| 3,920,598 A | 11/1975 | Reiff et al. |
| 4,259,384 A | 3/1981 | Velga et al. |
| 5,071,904 A | 12/1991 | Martin et al. |
| 5,539,021 A | 7/1996 | Pate et al. |
| 5,688,842 A | 11/1997 | Pate, III et al. |
| 5,959,027 A | 9/1999 | Jakubowski et al. |
| 6,231,926 B1 | 5/2001 | Ronzani et al. |
| 8,530,362 B2 | 9/2013 | Nungesser et al. |
| 2004/0109992 A1 | 6/2004 | Gribble et al. |
| 2009/0311480 A1* | 12/2009 | Fischer .................. B32B 27/12 428/160 |
| 2010/0003876 A1* | 1/2010 | Nungesser ........... C08F 265/04 442/59 |

* cited by examiner

POLYURETHANE DISPERSION BASED SYNTHETIC LEATHERS

CROSS REFERENCE TO RELATED APPLICATIONS

This application is a 35 USC § 371 national phase filing of PCT/CN2013/070353 filed Jan. 11, 2013.

FIELD

The present invention relates to a synthetic leather and a process for preparing thereof.

BACKGROUND

Polyurethane (PU) synthetic leathers generally comprise a fabric, a PU skin layer and a PU foam (also known as a poromeric layer) sandwiched between the fabric and the skin layer. The foam mainly contributes to softness and hand-feel of the PU synthetic leather. The skin layer can provide additional features including patterns, color, gloss, and abrasion resistance.

Currently, most PU synthetic leathers are made using volatile organic solvents such as dimethylformamide (DMF), methylethyl ketone (MEK) and toluene. These solvent-based systems are less environmentally friendly and less healthy than aqueous systems. Therefore, aqueous systems are more desirable.

Attempts have been made to minimize the use of volatile organic solvents in the manufacturing of PU synthetic leather. WO2004061198A1 discloses a method for preparing a synthetic leather including impregnating or coating a non-woven or woven textile with an aqueous polyurethane dispersion (also known as PUD) to form a poromeric layer. The prior art does not disclose how to prepare synthetic leathers comprising an outer layer that is also made from aqueous compositions.

In preparing solvent-based PU synthetic leathers, a release paper process is one widely used approach. The release paper process typically comprises the steps of: (1) providing a PU foam coated on a fabric, which is made using an organic solvent; (2) applying a solvent-based PU resin paste to a release paper to form a skin layer; (3) attaching the foam to the release paper with the skin layer therebetween to form a multilayer sheet; (4) peeling off the release paper from the multilayer sheet to obtain a synthetic leather with a surface that has a profile corresponding to that of the release paper. When an embossed release paper is used, the resultant PU synthetic leathers have an embossed surface, which is desirable for many applications for advantageous visual appearance.

Compared to solvent-based compositions used to form a skin layer, aqueous compositions usually have poorer coatability on release paper because release paper is hydrophobic. As a result, synthetic leathers made thereform may have a flawed surface, for example, holes or cracks on the surface. Thus, it is challenging to use the release paper process to prepare synthetic leathers which have both the foam and the skin layer made from aqueous compositions.

Moreover, replacing solvent-based compositions with aqueous compositions may have undesirable effects on mechanical properties of synthetic leathers. Synthetic leathers made from aqueous compositions contain surfactants and can be free of organic solvents. Both migration of surfactants to the interface of different layers, and an absence of organic solvents that can cause the molecules of polymer layers to interpenetrate may cause the synthetic leather to have lower interlayer adhesion strength than solvent-based PU synthetic leathers. In addition, aqueous compositions generally form films with lower film strength than that of solvent-based compositions, which may compromise bally flex property and/or abrasion resistance of the resultant synthetic leathers.

The PU synthetic leather industry requires synthetic leathers having certain adhesion strength and bally flex property to meet national and/or industry standards. The adhesion strength, that is, interlayer adhesion strength between any two adjacent layers of the synthetic leather, should be 1,000 gram per centimeter of sample width (g/cm) or more as measured by Method SLF11 adopted by the Society of Leather Technologists and Chemists. To withstand frequent bending during applications, PU synthetic leathers also need to pass 10,000 times of bally flex test as measured by China's GB/T 8949-1995. It is also desirable that PU synthetic leathers have sufficient abrasion resistance for use in some applications such as in automotives.

Therefore, it is desirable to provide a process for preparing a multilayer structure suitable for use as a synthetic leather, which is carried out free from organic solvents. It is desirable that such multilayer structure comprises a PU foam and a skin layer both made from aqueous compositions, and can be free from surface flaws. At the same time, it is desirable for such multilayer structure to have the previously described adhesion strength and bally flex property to meet national and/or industry standards. Moreover, it is desirable to provide a multilayer structure having an embossed surface while still having the previously described adhesion strength and bally flex property.

BRIEF SUMMARY

The present invention offers solutions to the problems of preparing a multilayer structure that is suitable for use as a synthetic leather, and that can be free from surface flaws and free from organic solvents, yet meets the national and/or industry requirements for adhesion strength and bally flex property, and desirable to have sufficient abrasion resistance for use in applications such as in automotives.

Surprisingly, an aqueous-based process produces a multilayer structure that can be free from surface flaws. The multilayer structure disclosed herein combines a specific skin layer with a PU foam and fabric. Such combination surprisingly provides the multilayer structure with an adhesion strength of 1,000 g/cm or more as measured by Method SLF11, and passes 10,000 times of bally flex test as measured by GB/T 8949-1995 standard. Moreover, the multilayer structure disclosed herein comprising an additional finishing layer can afford sufficient abrasion resistance as evidenced by no surface cracking and no peeling off, as determined by the test method described in ASTM D3884-01.The process disclosed herein is also able to simultaneously prepare a multilayer structure having an embossed surface while maintaining the above adhesion strength and ball flex property.

In a first aspect, the present invention is a multilayer structure comprising:

(a) a fabric, (b) a polyurethane foam containing a plurality of cells defined therein, wherein the foam contains at least one surfactant, and (c) a skin layer, wherein the skin layer comprises a wetting agent and an acrylic polymer having a glass transition temperature of −20 degree Celsius (° C.) or less, and the foam resides between the fabric and the skin layer.

In a second aspect, the present invention is a process for preparing the multilayer structure of the first aspect. The process comprises the steps of:

(i) providing a polyurethane foam coated on a fabric, wherein the foam contains a plurality of cells defined therein and at least one surfactant, (ii) providing a release paper, (iii) providing a skin layer, (iv) attaching the foam to the release paper with the skin layer therebetween to form a release sheet, so that the foam resides between the skin layer and the fabric; wherein the skin layer comprises a wetting agent and an acrylic polymer having a glass transition temperature of −20° C. or less, and (v) removing the release paper from the release sheet.

The process disclosed herein is useful for preparing the multilayer structure disclosed herein. The multilayer structure disclosed herein is useful as synthetic leather in applications such as automotive applications.

DESCRIPTION

Figure 1:
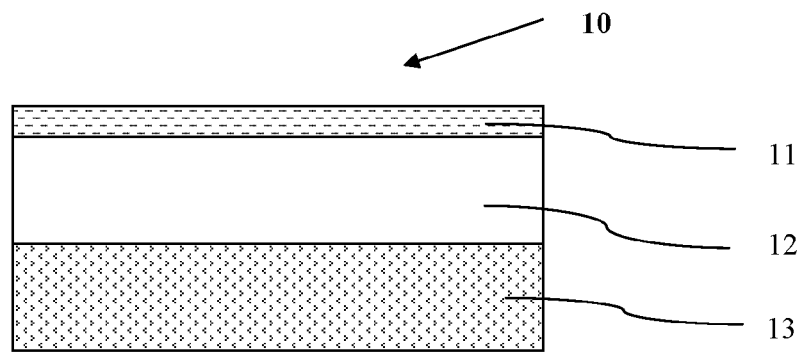
FIG. 1 is a schematic illustration of a cross-section of one embodiment of a multilayer structure described herein.

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International. GB refers Guo Biao.

"And/or" means "and, or as an alternative". All ranges include endpoints unless otherwise indicated.

The use of the term "(meth)" followed by another term such as acrylate in the present invention, refers to acrylate, methacrylate and mixtures thereof.

"Acrylic" means (meth)acrylic acid, (meth)alkyl acrylate, (meth)acrylamide, (meth)acrylonitrile and modified forms thereof, such as (meth)hydroxyalkyl acrylate.

Adhesion strength of a multilayer structure refers to interlayer adhesion strength between any two adjacent layers of the multilayer structure.

The present invention is a multilayer structure comprising a polyurethane (PU) foam that may comprise opposing primary surfaces. A "primary surface" is a surface having a planar surface area equal to the largest planar surface area of any surface of an article. Opposing primary surfaces refers to a primary surface of an article and a surface opposing the primary surface, the surface opposing the primary surface generally also being a primary surface. Planar surface area refers to the area of a surface as projected onto a plane so as to neglect surface area contributions due to contour features (for example, peaks and valleys) in the surface.

The PU foam in the present invention comprises a continuous PU matrix that defines a plurality of cells therein. The PU foam in the present invention contains one or more surfactant. The surfactant is a characteristic of having been made from a frothed composition comprising an aqueous PU dispersion (PUD) and is a surfactant that can stabilize air bubbles in the aqueous PUD when preparing the frothed composition. Another characteristic of a foam made from an aqueous PUD is that the foam can be free from organic solvents. The PU foam in the present invention is different from a PU foam that is made from solvent-based compositions (as opposed to an aqueous PUD). A PU foam made from solvent-based compositions contains organic solvents, and is free from surfactant.

Examples of suitable surfactants in the foam include cationic, anionic, or nonionic surfactants. Suitable surfactants include, for example, sulfates of ethoxylated phenols such as poly(oxy-1,2-ethanediyl).alpha.-sulfo-.omega.(nonylphenoxy) ammonium salt; alkali metal fatty acid salts such as alkali metal oleates and stearates; polyoxyalkylene nonionics such as polyethylene oxide, polypropylene oxide, polybutylene oxide, and copolymers thereof; alcohol alkoxylates; ethoxylated fatty acid esters and alkylphenol ethoxylates; alkali metal lauryl sulfates; amine lauryl sulfates such as triethanolamine lauryl sulfate; quaternary ammonium surfactants; alkali metal alkylbenzene sulfonates such as branched and linear sodium dodecylbenzene sulfonates; amine alkyl benzene sulfonates such as triethanolamine dodecylbenzene sulfonate; anionic and nonionic fluorocarbon surfactants such as fluorinated alkyl esters and alkali metal perfluoroalkyl sulfonates; organosilicon surfactants such as modified polydimethylsiloxanes; and alkali metal soaps of modified resins; and mixtures thereof. Preferably, the surfactant is selected from alkali metal fatty acid salts such as alkali metal oleates, alkali metal stearates and mixtures thereof. Representative examples of suitable surfactants include disodium octadecyl sulfosuccinimate, sodium dodecylbenzene sulfonate, sodium stearate and ammonium stearate. At least one surfactant in the foam is desirably amphoteric (for example, cocamidopropyl betaine). The foam useful in the present invention can comprise at least two surfactants, which are selected from ammonium stearate, cocamidopropyl betaine and disodium octadecyl sulfosuccinimate. Preferably, at least one surfactant is ammonium stearate.

The content of the surfactant in the foam may be from 0.05 weight percent (wt %) or more, 0.1 wt % or more, or even 0.2 wt % or more, and at the same time, desirably 10 wt % or less, 5 wt % or less, or even 3 wt % or less. Weight percentage of the surfactant is based on the weight of the foam.

The foam in the present invention may comprise one or more thickener (also known as rheology modifier). The thickener may be non-associative or associative. It may be a cellulose ether derivative, natural gum alkali swellable thickener, a clay material (such as bentonite), an acid derivative, an acid copolymer, a urethane associate thickener (UAT), a polyether urea polyurethane (PEUPU), a polyether polyurethane (PEPU), a hydrophobically modified ethoxylated urethane (HEUR) or mixtures thereof. Preferably, the thickener does not cause an aqueous PUD to become unstable. More preferably, the thickener is a water swellable thickener that is not ionized. Examples of useful thickeners include methyl cellulose ethers, alkali swellable thickeners (for example, sodium or ammonium neutralized acrylic acid polymers), hydrophobically modified alkali swellable thickeners (for example, hydrophobically modified acrylic acid copolymers), associative thickeners (for example, hydrophobically modified ethylene-oxide-based urethane block copolymers), and mixtures thereof.

Preferably, the thickener in the foam is based on an acrylic acid copolymer, for example, ethylene acrylic acid copolymer. Suitable commercially available thickeners include for example ACUSOL™ 810 A acrylic acid copolymer available from The Dow Chemical Company (ACUSOL is a trademark of Rohm and Haas Company). When present, the amount of the thickener may be generally 0.1 to 5 wt %, preferably 0.2 to 3 wt %, based on the weight of the foam.

The foam in the present invention may optionally comprise one or more additional additives known in the art. Examples of suitable additives include, fillers such as wood fibers, calcium carbonate ($CaCO_3$), silicon dioxide ($SiO_2$), titanium dioxide ($TiO_2$), magnesium oxide, aluminium oxide, talc, barium carbonate ($BaCO_3$), barium sulfate ($BaSO_4$), glass beads or combinations thereof; a thickeners; flame retardants; pigments; flowing additives; hand-feel modifiers (for example, organic silicon compounds); antioxidants (for example, polymeric hindered phenol resins); anti-ultraviolet additives; antistatic agents; antimicrobial agents; and combinations thereof. Typically, these additives may be in amount of 0 to 80 wt %, preferably 0 to 50 wt %, and more preferably 0 to 30 wt %, based on the weight of the foam.

The fabrics disclosed herein may comprise a flexible polymeric material that can be, for example, woven, nonwoven, knitted, plained or spunbond. The fabric can comprise natural and/or synthetic fibers. Fabrics useful in the present invention may comprise for example cotton, wool, hemp, silk, synthetic fibers based on polyolefins (for example, polyethylene or polypropylene), nylon, polyester, polyurethane (for example, a spandex material), polyamides, acrylic polymers, polyvinyl chlorides, polyvinylidene chlorides, polyvinyl alcohols, or mixtures thereof. The preferred fabric is prepared from polyester, polyethylene or polypropylene, or their mixtures with natural fibers. The fabric can have, or not, characteristics resulting from a pre-treatment, such as corona surface treatment and/or impregnation.

In the multilayer structure disclosed herein, the fabric and a skin layer are desirably on opposing primary surfaces of the foam. For example, it is desirable that the skin layer contacts one primary surface of the foam and the fabric contacts an opposing primary surface of the foam, thereby forming the multilayer structure comprising the foam residing between the skin layer and the fabric.

The skin layer in the present invention comprises a wetting agent and an acrylic polymer. The acrylic polymer has a glass transition temperature ($T_g$) of −20° C. or lower, preferably −25° C. or lower, more preferably −30° C. or lower, and most preferably −35° C. or lower. At the same time, the acrylic polymer desirably has a $T_g$ of −50° C. or higher. Measure $T_g$ by differential scanning calorimetry (DSC) taking the inflection point in the thermogram as the $T_g$ value.

The acrylic polymer useful in the present invention may function as a binder in the skin layer. The acrylic polymer can be a copolymer including at least one copolymerized ethylenically unsaturated monomer and from 0.4 to 10 wt %, preferably from 0.4 to 4 wt %, of copolymerized acetoacetate or acetoacetamide monomer, where wt % is relative to the total weight of monomers. Suitable ethylenically unsaturated monomers include for example a (meth)acrylic ester monomer including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, aminoalkyl (meth)acrylates; styrene or substituted styrenes; butadiene; vinyl acetate or other vinyl esters; vinyl monomers such as vinyl chloride, vinylidene chloride, N-vinyl pyrollidone; and acrylonitrile or methacrylonitrile. Preferred is the absence of copolymerized monomers containing functional group(s) capable of chemical reaction with acetoacetate or acetamide groups, for example, aldehyde and amine groups. Preferably, the acrylic polymer contains 25-65 wt % copolymerized ethyl acrylate, based on acrylic polymer weight.

The acrylic polymer useful in the present invention may be available in the form of an aqueous emulsion. The acrylic polymer emulsion generally has a solids content of from 25 to 40 wt %, or even from 30 to 35 wt %. Suitable commercially available acrylic polymer useful in the present invention may include for example HYDRHOLAC™ Cl-1 emulsion (HYDRHOLAC is a trademark of ROHM and HAAS Company) available from The Dow Chemical Company.

The content of the acrylic polymer in the skin layer is desirably 10 wt % or more, preferably 15 wt % or more, more preferably 20 wt % or more, and most preferably 30 wt % or more. At the same time, the content of the acrylic polymer is desirably 95 wt % or less, preferably 85 wt % or less, more preferably 80 wt % or less, and most preferably 75 wt % or less. Weight percentage of the acrylic polymer is based on the weight of the skin layer. If the content of the acrylic polymer in the skin layer is lower than 10 wt %, adhesion and bally flex properties of the resultant multilayer structure may be compromised.

The skin layer in the present invention also comprises one or more wetting agent (also known as leveling agent). The wetting agent may be any compound comprising one or more surface active compound that facilitates flow or wetting of a surface. Wetting agents can be anion, nonionic, or cationic surfactant. Examples of wetting agents include fluorine-containing surfactants, silicone-containing surfactants such as polysiloxane, alkyl poly(ethylene oxide) surfactants, and mixtures thereof. Preferably, the wetting agent is a silicon-containing compound. More preferably, the wetting agent is a polyalkyl siloxane surfactant. Suitable commercially available wetting agents useful in the present invention may include for example AQUADERM™ Fluid H wetting agent available from Lanxess Company (AQUADERM is a trademark of Lanxess Deutschland GmbH).

The content of the wetting agent in the skin layer is desirably 0.1 wt % or more, preferably 0.3 wt % or more, more preferably 0.4 wt % or more, and most preferably 0.5 wt % or more. At the same time, the content of the wetting agent is desirably 1.5 wt % or less, preferably 1 wt % or less, and more preferably 0.8 wt % or less. Weight percentage of the wetting agent is based on the weight of the skin layer.

The skin layer, in addition to the previously described acrylic polymer having $T_g$ of −20° C., may also comprise one or more additional polymer as an additional binder. The additional polymers can be any film-forming polymers known in the art, such as water-dispersible polymers. Suitable additional polymers include for example other acrylic polymer, polyurethane, polyurethane-acrylic hybrid or mixtures thereof. Preferably, the skin layer comprises polyurethane as the additional binder. Surprisingly, the combination of the polyurethane with the acrylic polymer having $T_g$ of −20° C. or less described above can further increase adhesion strength of the resultant multilayer structure, while still passing 10,000 times of bally flex test. Suitable polyurethanes and other acrylic polymers for use in the skin layer include those in commercially available PUDs such as BAYDERM™ 51 UD, BAYDERM 91UD (BAYDERM is a trademark of Bayer), and polyacrylate emulsions such as PRIMAL™ SCl-385, PRIMAL SB-155 (PRIMAL is a trademark of Rohm and Haas Company), all available from The Dow Chemical Company, and mixtures thereof.

When present in the skin layer, the additional polymer binder is desirably present in an amount of 2 wt % or more, preferably 5 wt % or more, and more preferably 10 wt % or more. At the same time, the concentration of the additional polymer binder is desirably 60 wt % or less, preferably 55 wt % or less, and more preferably 50 wt % or less. Weight percentage of the additional polymer binder is based on the total weight of the binders in the skin layer. If the concentration of the additional polymer binder is more than 60 wt %, the resultant multilayer structure may not achieve both the previous described bally flex property and adhesion strength.

The skin layer in the present invention may optionally comprise one or more matting agent (also known as a duller). The matting agent may be any microparticulate system producing a dulling effect. The matting agent can be an inorganic matting agent, an organic matting agent, or mixtures thereof. Examples of suitable matting agents include silica, carbonate, kaolin, phyllosilicates, talc, titania, zinc oxides, zirconium oxides, alkali hydroxides, polycondensate plastics (for example, polyurea), PU beads or polyacrylic beads dispersed in water, and mixtures thereof. The presence of the matting agent in the skin layer may be also helpful in enhancing coating film strength, thus increasing abrasion resistance of the resultant multilayer structure. Suitable commercially available matting agents useful in the present invention may include for example HYDRHOLAC UD-2 and HYDRHOLAC UD-4 dispersions available from The Dow Chemical Company, DEUTERON™ MK matting agent available from Deuteron (DEUTERON is a trademark of Silke Wankum), and mixtures thereof. The concentration of the matting agent in the skin layer is generally from 0 to 60 wt %, preferably from 5 to 50 wt %, based on the total weight of the skin layer.

The skin layer in the present invention may optionally comprise one or more hand-feel modifier. Hand-feel modifiers may migrate toward surfaces to adjust the hand feel of the multilayer structure. Examples of hand-feel modifiers include organic silicon compounds such as (organo)siloxanes and their copolymers, oils, waxes, and mixtures thereof. When the skin layer further comprises a silicon-containing hand-feel modifier, the surface of the resultant multilayer structure can have increased water repellency property. The hand-feel modifiers can be available in the form of an aqueous dispersion having a solids content of up to 60 wt %. Suitable commercially available hand-feel modifiers useful in the present invention may include for example ROSILK™ 2229 feel modifier available from The Dow Chemical Company (ROSILK is a trademark of Rohm and Haas Company).

When present, the content of hand-feel modifiers is generally up to 10 wt %, preferably up to 8 wt %, and more preferably up to 3 wt %, and at the same time, the amount of the hand-feel modifiers is desirably 0.1 wt % or more, and preferably 0.5 wt % or more. Weight percentage of the hand-feel modifier is based on the total weight of the skin layer. If the content of the hand-feel modifier is more than 10 wt %, the skin layer may be slippery or waxy.

The skin layer in the present invention may optionally comprise pigments and/or colorants. Pigments and/or colorants may be added so as to prepare a transparent or translucent film with a desired color. Examples of pigments or colorants may include iron oxides, opacifying pigments (for example, titanium oxide, carbon black), opacifying polymers and mixtures thereof. Pigments and/or colorants may be added in an amount of 0 to 120 parts per hundred parts of total binders in the skin layer. Suitable commercially available black pigments useful in the present invention may include for example EUDERM™ black BN carbon black dispersion available from Lanxess Company (EUDERM is a trademark of Lanxess Deutschland GmbH).

The skin layer in the present invention may optionally comprise one or more thickener. Suitable thickeners include those described in the foam. The thickeners in the skin layer are desirably selected from alkali swellable emulsions (ASE), hydrophobically-modified alkaline swellable emulsions (HASE), hydrophobically modified ethyleneoxide-urethane polymers (HEUR), hydrophobically-modified cellulosics, hydrophobically-modified polyacrylamides, inorganic clay materials (such as bentonite), hydroxyethyl cellulose (HEC), and mixtures thereof. Suitable commercially available thickeners useful in the present invention may include for example PRIMAL RM-1020 and PRIMAL RM-825 thickeners available from The Dow Chemical Company. The amount of the thickener in the skin layer is generally up to 20 wt %, preferably up to 10 wt %, based on the weight of the skin layer.

The skin layer in the present invention can further comprise, or be free from, any one or combination of more than one of the following additives: plasticizers such as dioctyladipate or dioctylphthalate in an amount of up to 20 wt %, preferably up to 2 wt %; antifoaming agents, antioxidants, or ultraviolet (UV) light absorbing agents in an amount of up to 5 wt %, preferably up to 1.0 wt %; and flame retardants in an amount of up to 5 wt %. Weight percentage of the additives is based on the weight of the skin layer.

The multilayer structure disclosed herein may further comprise a finishing layer, so that the skin layer is between the finishing layer and the foam. The presence of the finishing layer can further increase abrasion resistance of the multilayer structure comprising thereof. The finishing layer may comprise a wetting agent, and a crosslinked acrylic polymer wherein the acrylic polymer has a $T_g$ of −20° C. or lower. The acrylic polymer is as described in the skin layer. The content of the crosslinked acrylic polymer in the finishing layer is desirably 10 wt % or more, preferably 15 wt % or more, more preferably 20 wt % or more, and most preferably 25 wt % or more. At the same time, the content of the acrylic polymer is desirably 95 wt % or less, preferably 85 wt % or less, more preferably 50 wt % or less, and most preferably 35 wt % or less. Weight percentage of the crosslinked acrylic polymer is based on the weight of the finishing layer. The wetting agent and its concentration in the finishing layer are as described in the skin layer, with wt % relative to the finishing layer weight.

When present in the multilayer structure, the finishing layer can also comprise one or more than one polymer suitable for use in the skin layer. Desirably, the finishing layer comprises non-crosslinked acrylic polymer having a $T_g$ of −20° C. or lower to achieve desirably bally flex property. When the skin layer contains polyurethane as the additional binder, the finishing layer also desirably comprises polyurethane so as to further improve adhesion strength of the resultant multilayer structure. More preferably, the finishing layer comprises crosslinked polyurethane.

The polyurethane is as described in the skin layer. The finishing layer may also optionally comprise other components (for example, matting agent, hand-feel modifier, pigments and/or colorants, thickener or optional additives) as described in the skin layer. In addition to the skin layer or both the skin layer and the finishing layer, the multilayer structure disclosed herein can further comprise one or more than one optional additional layer such as a color layer between the skin layer and the finishing layer. Other suitable optional additional layers can be selected from a water repellent layer, UV protective layer and tactile (touch/feel) modification layer. Each of these other suitable optional additional layers, if present, is located with the skin layer between it and the foam.

The multilayer structure disclosed herein may further comprise a release paper, wherein the skin layer resides between the foam and the release paper. When the multilayer structure also comprises the finishing layer described above, the finishing layer resides between the skin layer and release paper, and the skin layer resides between the finishing layer and the foam.

The multilayer structure disclosed herein does not require an adhesive to attach the PU foam to the fabric. That is, the multilayer structure can be free of an adhesive between the PU foam and the fabric. Preferably, the multilayer structure has no detectable organic solvent, that is, the multilayer structure is free of organic solvents.

The multilayer structure disclosed herein desirably has no surface flaw, that is, free from surface flaws. "No surface flaws" and "free from surface flaws" means that the surface has no holes or cracks by visual observation. If the multilayer structure has an embossed surface, the embossing patterns can be evenly distributed on the surface.

The multilayer structure disclosed herein desirably has an adhesion strength of 1,000 g/cm or more according to Method SLF11, preferably 1,200 g/cm or more, and more preferably 1,500 g/cm or more. In addition, the multilayer structure disclosed herein is able to pass 10,000 times of bally flex test according to GB/T 8949-1995 standard.

The multilayer structure disclosed herein, in particular comprising the finishing layer, may afford sufficient abrasion resistance, that is no surface cracking and no peeling off, as determined by the test method described in ASTM D3884-01.

The multilayer structure disclosed herein may have a gloss of 80 degrees)(° or less, 60° or less, 10° or less, or even 2° or less, as measured according to ASTM D5767 1999.

The multilayer structure disclosed herein can include a design in the form of an image and/or textured pattern on one or more than one exposed surface. Such a design can be imparted onto a surface of the multilayer structure during or after formation of the multilayer structure. For example embossing or imprinting with an image (using ink or dye for example) can occur by any method known in the art including compression embossing by pressing with a heated patterned platen, rolling or spraying ink or dye onto a surface or imprinting with a texture via a textured release sheet.

The multilayer structure disclosed herein can be cut or otherwise shaped so as to have a shape suitable for any desired purpose, such as shoe manufacturing. The multilayer structure disclosed herein may be used in various applications particularly suitable for use as synthetic leather, for example, footwear, handbags, belts, purses, garments, furniture upholstery, automotive upholstery, and gloves. The multilayer structure is particular suitable for use in automotive applications.

The process disclosed herein is suitable for preparing the multilayer structure disclosed herein. The process disclosed herein comprise the following steps: (i) providing a polyurethane foam coated on a fabric, wherein the foam contains a plurality of cells defined therein and at least one surfactant, (ii) providing a release paper, (iii) providing a skin layer, (iv) attaching the foam to the release paper with the skin layer therebetween to form a release sheet, so that the foam resides between the skin layer and the fabric; wherein the skin layer comprises a wetting agent and an acrylic polymer having a glass transition temperature of −20° C. or less, and (v) removing the release paper from the release sheet. In step (i) of the process disclosed herein, the foam can be made from a frothed composition comprising an aqueous PUD, one or more surfactant that can stabilize air bubbles in the aqueous PUD when preparing the frothed composition described above, and optionally one or more thickener and additional additive described with respect to the foam above. The surfactant(s), and the thickener and additive (if present) may be added to the PUD or the PUD may be added to the surfactant(s). The frothed composition may comprise 50 to 99 wt % of aqueous PUD, preferably 60 to 99 wt %, based on the total weight of the frothed composition.

The aqueous PUD in the frothed composition can be an externally stabilized polyurethane dispersion or an internally stabilized polyurethane dispersion.

"Internally stabilized polyurethane dispersion" herein refers to a polyurethane dispersion that is stabilized through the incorporation of ionically or nonionically hydrophilic pendant groups within the polyurethane particles dispersed in the liquid medium. Examples of nonionic internally stabilized polyurethane dispersions are described in U.S. Pat. Nos. 3,905,929 and 3,920,598. Ionic internally stabilized polyurethane dispersions are well known and are described in U.S. Pat. No. 6,231,926. Typically, dihydroxyalkylcarboxylic acids such as described in U.S. Pat. No. 3,412,054 are used to make anionic internally stabilized polyurethane dispersions. A common monomer used to make an anionic internally stabilized polyurethane dispersion is dimethylolpropionic acid (DMPA).

Preferably, the aqueous PUD in the frothed composition is an externally stabilized polyurethane dispersion. "Externally stabilized polyurethane dispersion" herein refers to a polyurethane dispersion that substantially fails to have an ionic or nonionic hydrophilic pendant groups and thus requires the addition of a surfactant to stabilize the polyurethane dispersion. The surfactant can be those described in the foam above. Examples of externally stabilized polyurethane dispersions are described in U.S. Pat. Nos. 2,968,575; 5,539,021; 5,688,842 and 5,959,027.

Methods of preparing the foam by the frothed composition are known to those skilled in the art including, for example, a process described in WO2005/061198A1. One method of preparing the foam may comprise the steps of: (I) frothing a composition comprising the aqueous PUD, the surfactant, and optionally the thickener and additional additive described above to prepare the frothed composition, (II) applying the frothed composition to the fabric described above to form a coated fabric; (III) drying the coated fabric, that is, exposing the coated fabric to drying conditions for drying the frothed composition, and optionally passing through a pressing roller. Thus, a fabric coated with the PU foam forms. The method of preparing the foam generally also includes adjusting the thickness of the frothed composition on the fabric, after step (II) applying the frothed composition to the fabric described above to form a coated fabric.

The release paper useful in the process may be any release paper known in the art. The release paper generally has a hydrophobic surface. The release paper suitable for the present invention may have a flat surface or an embossed surface with patterns. Preferably, an embossed release paper, that is, a textured release paper, is used. The release paper may have various embossed patterns known in the art, such as texture of natural leather grain.

In step (iii) of the process disclosed herein, the skin layer can be prepared from an aqueous skin coating composition. The aqueous skin coating composition may comprise the wetting agent, the acrylic polymer having $T_g$ of −20° C. or less as the binder, and other optional components (for example, additional polymers as the additional binder, matting agent, hand-feel modifiers, pigments and/or colorants, thickener, additives) described above in the skin layer. The acrylic polymer can be in the form of an aqueous dispersion or emulsion, and mixed with other ingredients in any order to form the skin coating composition. Preferably, the aqueous skin coating composition comprises an aqueous polyurethane dispersion. When present, the polyurethane dispersion desirably has a film modulus of 2.5 megapascals (MPa) or less, 2.3 MPa or less, or even 2 MPa or less, so as to maintain the flexibility of the resultant skin layer. The solids weight of the aqueous skin coating composition is the same as the total weight of the skin layer. The concentration of each component in the aqueous skin coating composition can be obtained from the previously described concentration of the component in the skin layer. As an example, the acrylic polymer in the aqueous skin coating composition can be in an amount of from 10 weight percent to 95 weight percent, where weight percentage is based on the solids weight of the skin coating composition. In addition, water or diluents may be added as necessary into the aqueous skin coating composition to control the solids of the skin coating composition to a desired range. The aqueous skin coating composition useful in the present invention generally has a solids content of 20 wt % or more, 30 wt % or more, or even 40 wt % or more, and at the same time, generally 80 wt % or less, 70 wt % or less, or even 60 wt % or less, based on the total weight of the aqueous skin coating composition.

Viscosity of the aqueous skin coating composition is generally 500 centipoise (cps) or higher, 1,000 cps or higher, and at the same time, is generally 20,000 cps or lower, 15,000 cps or lower at 25° C. measured in accordance with ASTM D5125. If the viscosity is lower than 500 cps, the thickness of the dried coating film formed therefrom may be inconsistent. If the viscosity is higher than 20,000 cps, the skin coating composition may be difficult to level into the entire surface of a substrate to be coated.

To form the skin layer, the aqueous skin coating composition can be applied to, and adhered to a substrate (for example, the foam, other layer(s) of the multilayer structure disclosed herein, or preferably, the release paper) by conventional means such as brushing, dipping spraying and rolling coating, then dried and cured. The standard spray techniques and equipment for air spraying and electrostatic spraying, such as electrostatic bell application and either manual or automatic methods can be used. Preferably, rolling coating is used.

In the process disclosed herein, the release sheet can be obtained by the following steps: applying an aqueous skin coating composition to the foam, the release paper, or both the foam and the release paper, attaching the foam to the release paper with the aqueous skin coating composition therebetween, drying the aqueous skin coating composition to form the skin layer, and applying pressure to the resultant sheet, that is, pressing the resultant sheet. The above steps in preparing the release sheet can be conducted in a different order. For example, the process disclosed herein preferably includes firstly applying the aqueous skin coating composition to a textured release paper, followed by drying or at least partially drying the skin coating composition. Thus, the textured patterns on the release paper can be easily transferred to the skin layer of the resultant multilayer structure resulting in an embossed pattern on the skin layer. Drying the skin coating composition is preferably conducted before attaching to the foam, so that it can afford fast production speed without causing surface flaws on the resultant multilayer structure. When the aqueous skin coating composition is coated onto the foam, the coated foam is preferably partially dried before contacting the foam to the release paper, so as to balance quality of the patterns on the surface of the resultant multilayer structure and the production speed. Alternatively, pressure may be applied before drying the skin coating composition, which may be helpful to ensure close contact between different layers of the resultant multilayer structure. Applying pressure can be conducted prior to, during, and/or after drying the aqueous skin coating composition.

Preferably, the release sheet useful in the present invention is prepared by applying the aqueous skin coating composition to the release paper, drying the aqueous skin coating composition to form the skin layer, contacting the foam to the release paper with the skin layer therebetween, and applying pressure to the resultant sheet. One or more additional step of applying pressure may be used before drying the skin coating composition.

In step (v) of the process disclosed herein, the release paper is removed from the release sheet. Removing the release paper can be done by peeling the release paper from the release sheet. There is no residual left on the surface of the release paper after being peeling off from the release sheet, so the release paper can be recycled for re-use. The process disclosed herein may further comprise one or more pressing step after removing the release paper from the release sheet.

The process disclosed herein may further comprise the steps of: applying an aqueous finishing composition to the release paper in step (ii), then drying the aqueous finishing composition to form a finishing layer coated on the release paper; so that the skin layer resides between the foam and the finishing layer. Alternatively, the process disclosed herein may include applying the aqueous finishing composition to the skin layer of the multilayer structure obtained after step (v); then drying the aqueous finishing composition to form a finishing layer; so that the multilayer structure comprises the skin layer residing between the foam and the finishing layer. The aqueous finishing composition is the same as described above. The viscosity of the finishing composition may be the same as that of the skin coating composition.

The finishing layer in the process disclosed herein is made from the aqueous finishing composition. The aqueous finishing composition may comprise the wetting agent described above, an acrylic polymer emulsion, wherein the acrylic polymer has a glass transition temperature of −20° C. or lower as describe above, a crosslinking agent and optional components (for example, additional polymer binder, matting agent, hand-feel modifier, pigments and/or colorants, thickener and optional additives) described above. The acrylic polymer can be in the form of an aqueous dispersion or emulsion, and mixed with other ingredients in any order to form the finishing composition. Except for the crosslinking agent in the finishing composition, the concentration ranges of all other ingredients in the finishing composition can be the same as the aqueous skin coating composition for preparing the skin layer. Preferably, the aqueous finishing composition comprises an aqueous polyurethane dispersion. When present, the polyurethane dispersion in the finishing composition desirably has a film modulus of 2.5 MPa or higher, 2.7 MPa or higher, or even 3 MPa or higher, so as to further increase the abrasion resistance of the resultant multilayer structure.

The crosslinking agent in the aqueous finishing composition can be any compound that can crosslink the acrylic polymer. The crosslinking agent desirably can also crosslink polyurethane. The crosslinking agent may comprise amine crosslinking agents, amide-aldehyde condensates, polyisocyanate crosslinking agents or mixtures thereof. Suitable crosslinking agents may include for example those crosslinking agents described in U.S. Pat. No. 5,071,904. Representative examples of the crosslinking agent include polyisocyanates, polyazirdines, aminoplast resins and mixtures thereof. Preferably, polyisocyanate crosslinking agents are used. Suitable commercially available crosslinking agents useful in the present invention may include for example BAYDERM XL-50, BAYDERM XL-60 and BAYDERM XL-90 polyisocyanates all available from Lanxess Company, and mixtures thereof. The crosslinking agent is desirably in an amount that can partially crosslink the acrylic polymer in the finishing composition. The concentration of the crosslinking agent in the finishing composition may be 0.1 wt % or more, preferably 0.2 wt % or more, and more preferably 0.5 wt % or more. At the same time, the concentration of the crosslinking agent is desirably 50 wt % or less, preferably 40 wt % or less, and more preferably 35 wt % or less. Weight percentage of the crosslinking agent is based on the total weight of the aqueous finishing composition.

To form the finishing layer, the aqueous finishing composition can be coated to a substrate by conventional means described above.

Preferably, the process disclosed herein comprises the steps of: applying the aqueous finishing composition to a release paper to obtain a coated release paper, then passing the coated release paper through an oven to dry the aqueous skin coating composition, so as to form the finishing layer; applying the aqueous skin coating composition to the dried finishing layer, then contacting with the foam so that the aqueous skin coating composition resides between the finishing layer and the foam; passing the resultant release sheet through a pressing roller; then passing through an oven to dry the aqueous skin coating composition; passing through a pressing roller again; and finally removing the release paper from the release sheet.

In the process disclosed herein, drying the aqueous skin coating composition or, if present the aqueous finishing composition can form the skin layer or, if present the finishing layer. "Drying" in the present invention means a process involving, but not limited to, the removal of water and solvent (if present) by evaporation. Drying in the present invention can also involve chemical reactions such as a crosslinking reaction (that is, a curing reaction). For example, drying the aqueous finishing composition which comprises a crosslinking agent also means drying and curing the aqueous finishing composition. Drying may be conducted at any temperature, so long as fully dried coating films are formed and no component in the multilayer structure decomposes. In particular, when drying is conducted after attaching the foam to the release paper with aqueous compositions therebetween, water vapor generating from these wet aqueous compositions may reside between the release paper and the foam. Release paper is generally impermeable to water vapor, thus water vapor tends to diffuse through the foam and even fabric during the drying process. Accumulated water vapor between layers may cause delamination of the resultant multilayer structure. To avoid potential delamination of the multilayer structure, these aqueous compositions is desirably slowly dried; or the aqueous skin coating composition or, if present the aqueous finishing composition is desirably firstly applied to the release paper, and dried and cured the above aqueous compositions before contacting with the foam.

In the process disclosed herein, time for drying the skin coating composition and the finishing composition (if present) is desirably 0.5 minutes or more, preferably 1 minutes or more, and more preferably 2 minutes or more, and at the same time, is desirably 30 minutes or less, preferably 25 minutes or less, and more preferably 20 minutes or less. Drying step(s) is desirably conducted at a temperature of about 90° C. or more, preferably 100° C. or more, more preferably 105° C. or more, and at the same time, is desirably 200° C. or less, preferably 180° C. or less, and more preferably 150° C. or less. If the drying time is less than 0.5 minutes, coating films made therefrom may not be fully dried. If the temperature is lower than 90° C., it may take too long to fully dry the aqueous compositions. If the temperature is higher than 150° C., too fast water evaporation during the drying step(s) may cause flaws on the surface of the resultant multilayer structure.

In the process disclosed herein, one or more step of applying pressure is useful to ensure all layers of the multilayer structure to closely contact and/or adhere with each other. Applying pressure may be conducted at conventional equipments such a pressing roller. Applying pressure can be conducted under conditions that have no adverse effects on the foam structure of the PU foam in the multilayer structure. Preferably, thickness change of a sample before and after applying pressure is up to 5%. Depending on temperature and time used when applying pressure, the pressure used is desirably 0.2 MPa or less, 0.15 MPa or less, or even 0.1 MPa or less. The step of applying pressure may be conducted at a temperature higher than $T_g$ of the acrylic polymer binder. Preferably, applying pressure step is conducted right after drying a sample, so that the pressing roller used for applying pressure does not require to be heated. The step(s) of applying pressure in the process disclosed herein is desirably conducted at a temperature of 100° C. or lower, and at the same time, desirably 60° C. or higher, 70° C. or higher, or even 90° C. or higher. Time for applying pressure may be from 10 seconds or longer, or even 20 seconds or longer, and at the same time, 300 seconds or shorter, 200 seconds or shorter, or even 60 seconds or shorter.

The process disclosed herein does not require the use of any organic solvent. Preferably, no organic solvent is used in the process, and aqueous compositions used in the process have no detectable organic solvent present, that is, the process is free of organic solvents.

The multilayer structure obtained from the process disclosed herein desirably has a surface free from flaws. The multilayer structure may have a flat surface if a release paper with a flat surface is used, or has an embossed surface when using an embossed release paper.

When an embossed release paper is used, the process disclosed herein can simultaneously prepare a multilayer structure with a surface that has a profile corresponding to that of the release paper. Thus, the process disclosed herein does not require the use of additional conventional embossing equipment and steps to offer the multilayer structure with an embossed surface. If an embossed release paper is used, the process disclosed herein is able to prepare a multilayer structure that simultaneously has an embossed surface that can be free from any flaws. At the same time, the embossed multilayer structure obtained from the process disclosed herein still has an adhesion strength of 1,000 g/cm or more, and passes 10,000 times of bally flex test. In contrast, when the multilayer structure disclosed herein is further embossed by a conventional direct embossing process (that is, an embossing process using a conventional embossing roller), the bally flex property of the multilayer structure is significantly compromised, which fails to pass 10,000 times of bally flex test, as described in Comparative Example F.

Generally, the thickness of the skin layer may be 5 to 500 microns, 10 to 400 microns, 15 to 300 microns, or even 100 to 300 microns. The thickness of the foam may be 500 to 2,000 microns, 600 to 1,500 microns, or even 650 to 1,200 microns. The thickness of the fabric may be 0.2 to 2 millimeter (mm), 0.5 to 1.5 mm, or even 0.1 to 2 mm. The thickness of the multilayer structure may be 0.8 to 3 mm, 0.9 to 2.5 mm, or even 1.0 to 1.5 mm. When present, the finishing layer may have a thickness in the range of from 5 to 500 microns, from 10 to 400 microns, from 15 to 300 microns, or even from 30 to 100 microns.

With reference to FIG. 1, there is shown a schematic perspective view of one embodiment of a multilayer structure 10 disclosed herein comprising skin layer 11, foam 12, fabric 13 and optionally one or more other layers therebetween. Each layer comprises two opposing primary surfaces. Skin layer 11 contacts one primary surface of foam 12 and fabric 13 contacts the opposing primary surface of foam 12, so that foam 12 resides between skin layer 11 and fabric 13. An optional finishing layer (not shown) may reside on one primary surface of skin layer 11, so that skin layer 11 resides between the finishing layer and foam 12.

Figure 2:
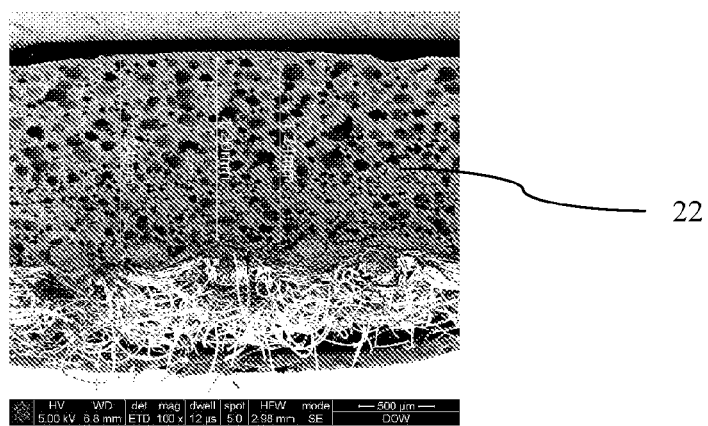
FIG. 2 is a scan electron microscopy (SEM) image of a cross-section of one embodiment of a multilayer structure described herein.

With reference to FIG. 2, there is shown a SEM image of a cross-section of a multilayer structure disclosed herein. The multilayer structure comprises foam 22.

Figure 3:
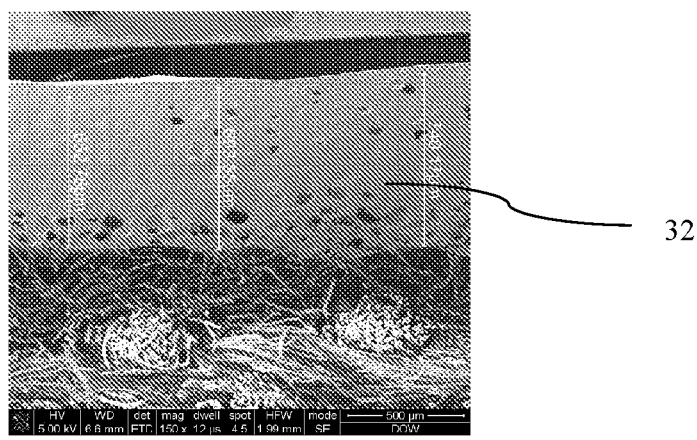
FIG. 3 is a SEM image of a cross-section of a multilayer structure embossed by a conventional direct embossing machine.

With reference to FIG. 3, there is shown a SEM image of a cross-section of a multilayer structure embossed by a conventional direct embossing machine. The multilayer structure comprises foam 32.

EXAMPLES

The following examples illustrate embodiments disclosed herein. All parts and percentages in the examples are by weight unless otherwise indicated. The following materials are used in the examples:

EUDERM black BN dispersion is a carbon black dispersion having a solids content of 20 wt %, available from Lanxess Company.

HYDRHOLAC UD-2 dispersion is an aqueous dispersion of a fully reacted aliphatic polyurethane polymer. It contains silica and has a solids content of 25 wt %, available from The Dow Chemical Company.

ROSILK 2229 feel modifier is an aqueous emulsion of polyalkyl siloxane having a solids content of 30 wt %, available from The Dow Chemical Company.

HYDRHOLAC Cl-1 emulsion is an acrylic polymer emulsion ($T_g$=−40° C.) having a solids content of 36-38 wt %, available from The Dow Chemical Company.

BAYDERM 91UD dispersion is an aqueous polyurethane dispersion ($T_g$=−44° C.), based on isophorone diisocyanate (IPDI) and polyester polyol, stabilized by carboxylate group(s) existing in the polyurethane backbone. It has a solids content of 30 wt %, available from The Dow Chemical Company.

AQUADERM Fluid H wetting agent is a silicone-based wetting agent available from Lanxess Company.

BAYDERM XL-50 crosslinking agent has around 6 wt % of active isocyanate groups (—NCO) and is emulsifiable when mixing with water, available from Lanxess Company.

Nappa Soft S-C is a wax and polyacrylate hybrid emulsion used as a matting agent, available from Lanxess Company.

Matting Agent SNC is a silica-containing polyacrylate emulsion as matting agent, available from Lanxess Company.

BAYDERM 51-UD dispersion is an aqueous polyurethane dispersion (Tg=−54° C.), based on IPDI and polyester polyol, stabilized by carboxylate group(s) existing in the polyurethane backbone. It has a solids content of around 30 wt %, available from The Dow Chemical Company.

PRIMAL SCl-385 emulsion is a polyacrylate emulsion (Tg=−12° C.) having a solids content of 46-48 wt %, available from The Dow Chemical Company.

PRIMAL SB-155 emulsion is a polyacrylate emulsion ($T_g$=−10° C.) having a solids content of 34-36 wt %, available from The Dow Chemical Company.

Fabric is needled cotton and polyester fiber hybrid woven fabric, available from Fujian Nanfang Textile Co. Ltd.

An embossed release paper with patterned surface is available from Arjowiggins.

SYNTEGRA™ YS3000 dispersion (SYNTEGRA is a trademark of The Dow Chemical Company) is a polyurethane dispersion, which is a waterborne, methylene diphenyl diisocyanate (MDI) based polyurethane produced without the use of organic solvents. It is a white liquid that typically has a solids content of 53-56 wt % and a density of 1.05 grams per cubic centimeter (g/cc) at 25° C., available from The Dow Chemical Company.

Stanfax 320 ammonium stearate surfactant, Stanfax 318 disodium octadecyl sulfosuccinimate surfactant, and Stanfax 590 cocamidopropyl betaine surfactant are all available from Para-Chem.

ACUSOL 810 acrylic acid copolymer thickener is available from The Chemical Company.

The following standard analytical equipment and methods are used in the Examples.

Adhesion Test

Adhesion strength of each multilayer structure was measured in accordance with Method SLF11 adopted by Society of Leather Technologists and Chemists. Adhesion strength refers to interlayer adhesion strength between any two adjacent layers of the multilayer structure. Samples with a width of one centimeter were used for testing. The skin layer, or finishing layer (if present) of the sample was firstly adhered to a polyvinyl chloride (PVC) test strip using an adhesive. Increasing static loads were applied to the multilayer structure until the sample delaminated. The maximum load before the delamination of the sample was recorded as gram per centimeter of sample width (g/cm).

Bally Flex Test

The bally flex property of a multilayer structure was measured by in accordance with GB/T 8949-1995 standard. A sample (3.8 cm by 6.5 cm) was positioned on a bally flexometer (Gotech Company) and flexed for up to 100,000 times at ambient temperature (from 22° C. to 25° C.). After flexing, the sample was observed under an optical microscope at a 10× (ten times) magnification. If no cracking and generation of "white crazing" in the flexing area is observed, the sample passes 10,000 times of bally flex test.

Abrasion Test

The abrasion resistance of a multilayer structure was measured in accordance with ASTM D3884-01 test (H-18 wheel, 1.0 kilogram (Kg), 500 cycles). If no cracking or peeling off was observed on the surface of a sample, the sample passed the abrasion test. In addition, lower weight loss of a sample after the abrasion test means better abrasion resistance.

Evaluation of Surface Flaw

The surface of the skin layer, or the finishing layer (if present) of a multilayer structure was visually observed. If no flaw (that is, no cracks or holes) was observed on the surface of the multilayer structure, it indicates the multilayer structure has no surface flaw.

Preparation of a PU Foam

The PU foam was made using a frothed composition containing PUD. 1200 grams (g) of SYNTEGRA 3000 PU dispersion having a solids content of 53-56 percent by weight, 48.0 g of ammonium stearate (Stanfax 320), 15.6 g of disodium octadecyl sulfosuccinimate (Stanfax 318), 13.5 g of cocamidopropyl betaine (Stanfax 590) and 79.4 g of ACUSOL 810A acrylic acid copolymer thickener were mixed. The viscosity of the thickened PUD was around 23,300 cP measured using a Brookfiled viscometer with a #6 spindle at 20 revolutions per minute (rpm). A fabric was attached to pin frame. The mixture was frothed using a Model 2MT1A foam machine (E.T. OAKES Corp.) run at 1000 rpm. The density of the resultant wet froth is about 0.69 g/cm³. The froth was applied to fixed fabric using a Labcoater type LTE-S(Werner Mathis AG). The doctor knife was positioned at 1.8-2.5 mm between the roller and knife (including resin and fabric). The resultant frothed dispersion was coated on the fabric by the doctor knife. The coated fabric was then placed in an oven at 100° C. for 6 to 10 minutes, and then heated to 170° C. in about 5 minutes to form the PU foam coated on the fabric.

Preparation of Aqueous Coating Compositions

Aqueous coating compositions (Coatings 1-4, Comparative Coatings A-F) were prepared as follows. The ingredients in these coating compositions are described in Table 1. Firstly, pigment(s) was dispersed in water by a high shear mixer (COWLES mixer) to form a pre-dispersed pigment paste. Then, binders and other components except for thickener and crosslinking agent (if present), were added to the pre-dispersed pigment paste under low shear stirring. The resultant mixture was then filtered to remove agglomerated particles. Finally, thickener and crosslinking agent (if present) were added in to the mixture.

Examples 1-2, Comparative Examples (Comp. Ex.) A-D

Coatings 1-2 and Comparative Coatings A-D were coated on an embossed release paper by roll knives with the knife gap of approximately 200 microns, and then dried in an oven at 130° C. for 1 minute to form a skin layer. The resultant coated release paper was attached to the PU foam obtained above with the skin layer therebetween, then passed through a pressing machine (Carvel model 4128 from Carvel Inc.) under the condition of 0.10 MPa, and 100° C. for 50 seconds. The resultant release sheet was cooled down to ambient temperature, then the release paper was peeled off. Multilayer structures comprising the foam, the fabric and the skin layer residing therebetween were obtained.

Example 3-5, Comp Example E

An aqueous finishing composition for preparing a finishing layer was firstly coated on an embossed release paper by a roll knife with the knife gap of around 60 microns, then dried in an oven at 130° C. for 0.5 minute to form the finishing layer. The resultant finishing layer was further coated with an aqueous skin coating composition for preparing skin layer by a roll knife with the knife gap of around 200 microns, then dried in an oven at 130° C. for 1 minute to form the skin layer. The resultant coated release paper was attached to the PU foam obtained above with the skin layer and finishing layer therebetween, then passed through a pressing machine (Carvel model 4128 from Carvel Inc.) under the condition of 0.10 MPa, and 100° C. for 50 seconds. The resultant release sheet was cooled down to ambient temperature, then the release paper was peeled off to obtain the multilayer structures of Example 3-5 and Comparative Example E.

TABLE 1

| Component | Function | Coating 1 | Coating 2 | Coating 3 | Coating 4 | Comp. Coating A | Comp. Coating B | Comp. Coating C | Comp. Coating D | Comp. Coating E |
|---|---|---|---|---|---|---|---|---|---|---|
| | | | | | (Values below are in grams) | | | | | |
| EUDERM black BN | Pigment | 100 | 150 | 4 | 4 | 100 | 100 | 100 | 100 | 4 |
| Nappa Soft S-C | Matting agent | 100 | 100 | — | — | 100 | 100 | 100 | 100 | — |
| Matting Agent SNC | Matting agent | 50 | 50 | — | — | 50 | 50 | 50 | 50 | — |
| BAYDERM 91UD | Binder | — | — | 8 | 18 | — | — | — | — | 38 |
| BAYDERM 51-UD | Binder | — | 100 | — | — | — | — | 500 | 500 | — |
| HYDRHOLAC C1-1 | Binder | 500 | 480 | 30 | 20 | — | — | — | — | — |
| PRIMAL SC1-385 | Binder | — | — | — | — | 500 | — | — | — | — |
| PRIMAL SB-155 | Binder | — | — | — | — | — | 500 | — | — | — |
| AQUADERM Fluid H | Wetting agent | 8 | 8 | 4 | 4 | 8 | 8 | 8 | — | — |
| HYDRHOLAC UD-2 | Matting agent | — | — | 80 | 80 | — | — | — | — | 80 |
| ROSILK 2229 | Hand-feel modifier | — | — | 8 | 8 | — | — | — | — | 8 |
| BAYDERM XL-50 | Crosslinking agent | — | — | 21 | 31.5 | — | — | — | — | 21 |

Properties of the above multilayer structures were evaluated according to the testing methods described above. Results were given in Tables 2 and 3.

The multilayer structures of Examples 1-5 and Comparative Examples A-C had good pattern fullness and definition. In contrast, the multilayer structures of Comparative Examples D-E, where the skin layer or, if present the finishing layer does not contain a wetting agent, showed a flawed surface with holes, which does not have a corresponding profile with the release paper.

As shown in Tables 2 and 3, the multilayer structures of Examples 1-5 showed an adhesion strength of higher than 1,000 g/cm and passed 100,000 times of bally flex test. The multilayer structures of Examples 2, 4 and 5 showed even better adhesion strength than that of Examples 1 and 3.

Abrasion resistance of the multilayer structures of Examples 3-5 was measured according to ASTM D3884-01. Each of these multilayer structures had no surface cracking or peeling off during the test. Weight losses for the multilayer structures of Examples 3, 4 and 5 are only 20-29 milligrams (mg), 9-18 mg, and 20-28 mg, respectively.

In contrast, the multilayer structures of Comparative Examples A and B had adhesion strength values less than 1,000 g/cm. In addition, cracks were formed on the skin layer of the multilayer structures of Comparative examples A and B after only 80,000 times and 20,000 times of bally flex test, respectively. Although the multilayer structure of Comparative Example C had an adhesion strength of 3,200 g/cm, it failed 10,000 times of bally flex test.

TABLE 2

|  | Example 1 | Example 2 | Comp. Ex. A | Comp. Ex. B | Comp. Ex. C | Comp. Ex. D |
|---|---|---|---|---|---|---|
| Skin Coating | Coating 1 | Coating 2 | Comp. Coating A | Comp. Coating B | Comp. Coating C | Comp. Coating D |
| Adhesion Strength, g/cm | 1.4 | 2.0 | 0.6 | 0.1 | 3.2 | — |
| Bally flex, times | 100,000 | 100,000 | 80,000 | 20,000 | 20,000 | — |
| Surface | no surface flaw | no surface flaw | no surface flaw | no surface flaw | no surface flaw | having flaws |

TABLE 3

|  | Example 3 | Example 4 | Example 5 | Comp. Ex. E |
|---|---|---|---|---|
| Skin Coating | Coating 1 | Coating 2 | Coating 2 | Comp. Coating D |
| Finishing Coating | Coating 3 | Coating 4 | Coating 3 | Comp. Coating E |
| Adhesion Strength, g/cm | 1,500 | 2,200 | 2,300 | — |
| Bally Flex, times | 100,000 | 100,000 | 100,000 | — |
| Abrasion test | Pass | Pass | Pass | — |
| Surface | no surface flaw | no surface flaw | no surface flaw | having flaws |

Example 6

Coating 1 was coated on the PU foam obtained above by a roll knife with wet thickness of 200 microns, then dried in an oven at 150° C. for 2 minutes to form a skin layer. Coating 3 was further coated on the skin layer with wet thickness of 60 microns, then dried in an oven at 150° C. for 1 minute to form an finishing layer. The resultant multilayer structure was then cooled down to ambient temperature for performance tests.

Comparative Example F Preparation of an Embossed Multilayer Structure by Conventional Conditioning Direct Embossing Coating 1 was coated on the PU foam obtained above by a roll knife with wet thickness of 200 microns, then dried in an oven at 150° C. oven for 2 minutes to form a dried skin layer. Coating 3 was further coated on the dried skin layer with wet thickness of 60 microns, then dried in an oven at 150° C. for 1 minute to form an finishing layer. The resultant sample was then embossed using an ironing and embossing machine (Model: GJ5D2-300 from Tianjin Leather Machninery Co. Ltd) under the condition of 0.3 MPa, and 120° C. for 40 seconds, wherein the finishing layer was contacted with the roller. The resultant multilayer structure was then cooled down to ambient temperature for performance tests.

The multilayer structure of Example 6 had an adhesion strength of around 1,250 g/cm and passed 10,000 times of bally flex test. In addition, the multilayer structure of Example 6 showed soft handfeel. In contrast, the embossed multilayer structure of Comparative Example F failed the bally flex test at 45,000 times of flexing, which also exhibited stiff handfeel. SEM images of the multilayer structures of Example 6 and Comparative Example F are shown in FIGS. 2 and 3, respectively. The foam in the multilayer structure of Comparative Example F deformed severely compared to that of Example 6. The foam thickness of the multilayer structure of Example 6 was about 1200 microns as shown in FIG. 2. The foam thickness of the multilayer structure of Comparative Example F was about 650-750 microns as shown in FIG. 3.

What is claimed is:

1. A multilayer structure comprising:
   (a) a fabric,
   (b) a polyurethane foam containing a plurality of cells defined therein and at least one surfactant,
   (c) a skin layer,
   wherein the skin layer comprises a wetting agent and an acrylic polymer having a glass transition temperature of −20 degree Celsius or less, and the foam resides between the fabric and the skin layer, and
   (d) a finishing layer, wherein the skin layer resides between the finishing layer and the foam, and the finishing layer comprises a wetting agent, a crosslinked acrylic polymer wherein the acrylic polymer has a glass transition temperature of −20 degree Celsius or less.

2. The multilayer structure of claim 1, wherein the wetting agent is selected from a silicon surfactant, a fluorine surfactant or mixtures thereof.

3. The multilayer structure of claim 1, wherein the finishing layer is embossed.

4. The multilayer structure of claim 1, wherein the multilayer structure is free of organic solvent.

5. The multilayer structure of claim 1 further comprising (e) a release paper, wherein the finishing layer resides between the skin layer and the release paper.

* * * * *